(No Model.) 2 Sheets—Sheet 1.

W. W. SUTCLIFFE & J. D. SULLIVAN.
HEATING AND FILTERING APPARATUS.

No. 431,923. Patented July 8, 1890.

Witnesses,
Robert Everett,
J. G. Meyers Jr.

Inventors,
William W. Sutcliffe.
John D. Sullivan.
By James L. Norris.
Atty.

(No Model.) 2 Sheets—Sheet 2.
W. W. SUTCLIFFE & J. D. SULLIVAN.
HEATING AND FILTERING APPARATUS.

No. 431,923. Patented July 8, 1890.

Witnesses:
Robert Everett
J. G. Meyers Jr.

Inventors,
William W. Sutcliffe,
John D. Sullivan.
By James L. Norris.
Atty.

UNITED STATES PATENT OFFICE.

WILLIAM W. SUTCLIFFE AND JOHN D. SULLIVAN, OF NEW ORLEANS, LOUISIANA.

HEATING AND FILTERING APPARATUS.

SPECIFICATION forming part of Letters Patent No. 431,923, dated July 8, 1890.

Application filed September 11, 1889. Serial No. 323,601. (No model.)

*To all whom it may concern:*

Be it known that we, WILLIAM W. SUTCLIFFE and JOHN D. SULLIVAN, citizens of the United States, residing at New Orleans, in the parish of Orleans and State of Louisiana, have invented new and useful Improvements in Heating and Filtering Apparatus, of which the following is a specification.

Our present invention relates to apparatus for filtering and clarifying water and other liquids or for heating, filtering, and evaporating fluids for various purposes.

It is the purpose of said invention to provide simple means whereby the temperature of the fluid may be raised as it passes to and through the filter, and the impurities removed therefrom in part before entering the filtering material, and whereby the steam and vapors generated by the heat may be withdrawn from the vessel in which the operation is carried out and condensed.

It is our purpose, also, to so construct and organize an apparatus of this type that the current may be reversed and driven through the filter by steam-pressure, whereby the sediment and accumulated foreign matter may be driven off and the filtering diaphragms and material cleansed.

It is our purpose, finally, to provide a simple easily-operated apparatus whereby any fluid or fluids—such as saccharine juices and sirups or glue or other solutions—may be filtered and clarified, and whereby water or any other liquid may be filtered and purified and simultaneously heated preparatory to its introduction to a steam-boiler, evaporator, or other receptacle.

The invention consists to these ends in the several novel features of construction and new combination of parts hereinafter fully set forth, and then defined in the claims following this specification.

In order to enable those skilled in the art to practice said invention, we will now proceed to describe the same in detail, reference being had to the accompanying drawings, in which—

Figure 1:
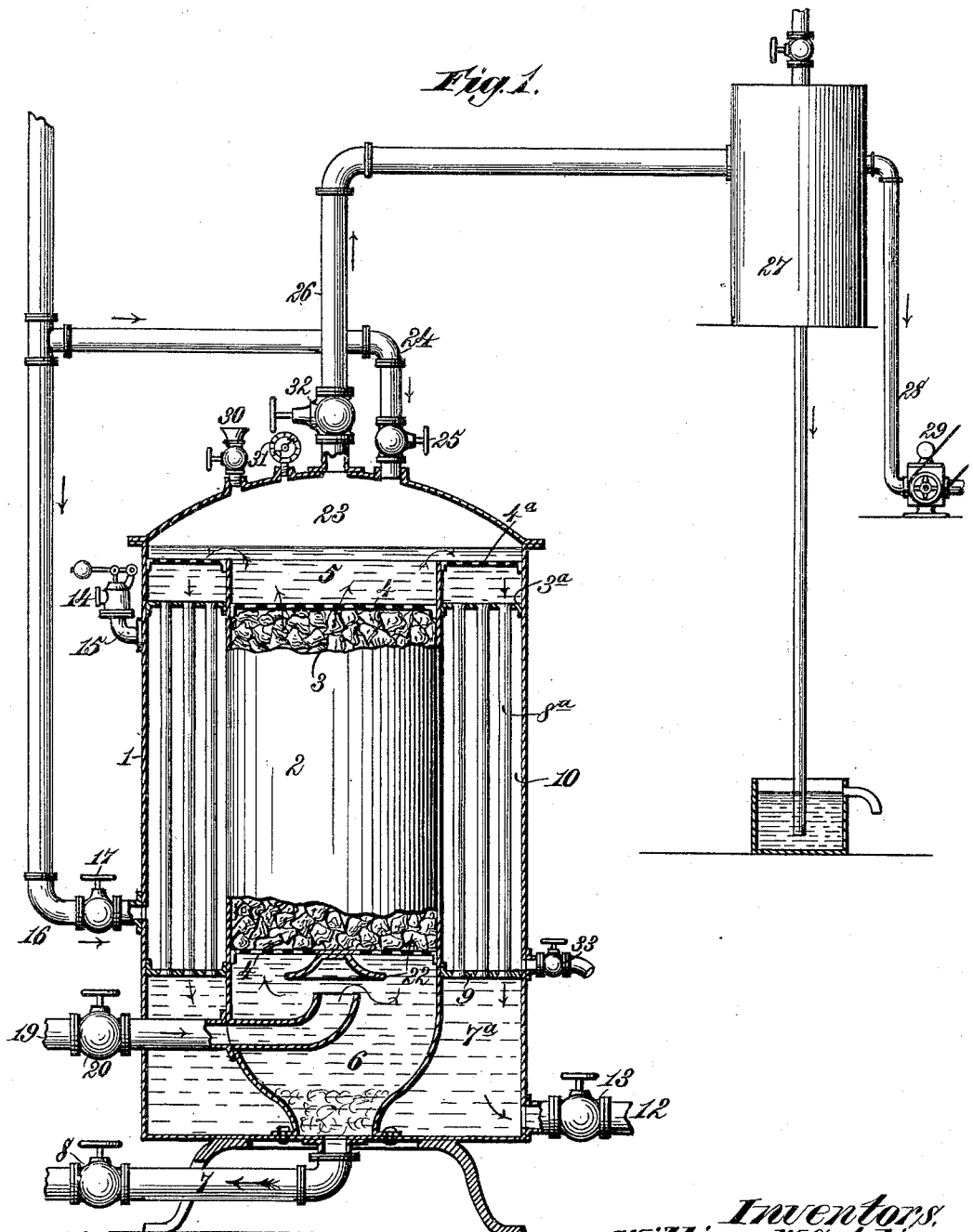
Figure 2:
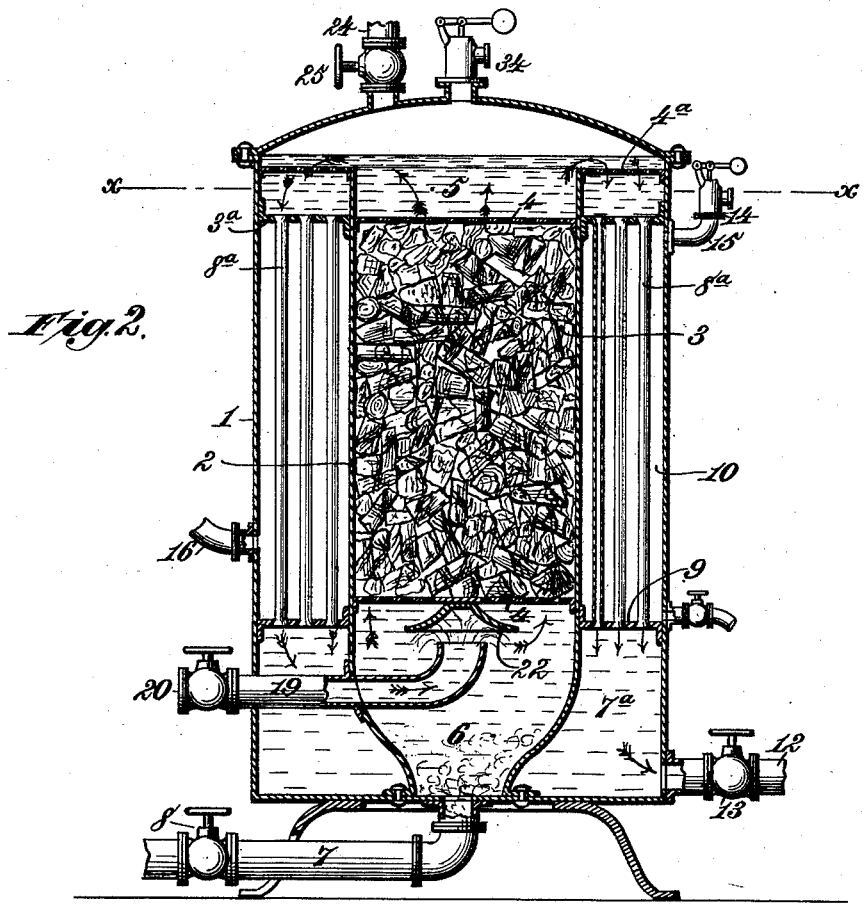
Figure 3:
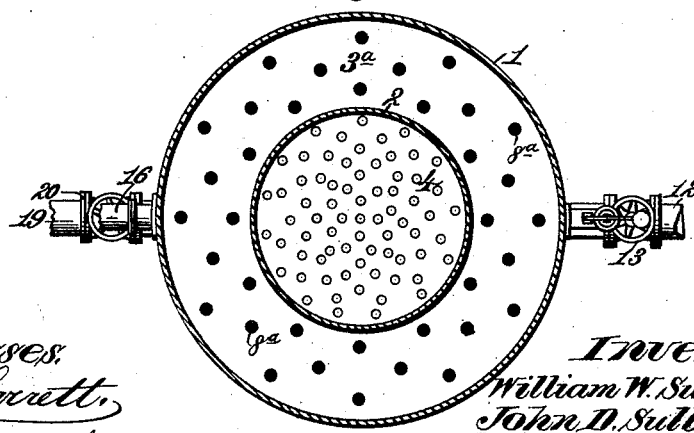

Figure 1 is a central vertical section, partly in elevation, of an apparatus embodying our invention. Fig. 2 is a similar view showing a modified form. Fig. 3 is a horizontal section on the line $x\,x$, Fig. 2.

In the said drawings, the reference-numeral 1 denotes a closed casing, formed of any suitable material, and preferably cylindrical in form, though other shapes may be used, if preferred. Within this casing is arranged a casing 2 of substantially similar form, but of less diameter and length, whereby an annular space is provided between the inner and outer casings. The inner casing 2 is provided with a filtering-chamber 3, filled with coke or other suitable material for the purpose, confined above and below by a reticulated or perforated diaphragm 4, the upper diaphragm being arranged somewhat below the upper edge or rim of the vessel 2, whereby a water-space 5 is provided. The lower diaphragm is arranged at such a point that a sediment-chamber 6 of suitable dimensions is provided in the lower end of the casing 2, which may be funnel-shaped, in order to guide the accumulation of foreign matter to an exit. A blow-off pipe 7 enters the contracted end of the lower or funnel-shaped portion 6 and passes outside the lower end of the outer casing, where it is provided with a cut-off or valve 8 of any suitable form.

Extending from the top of the cylindrical casing 2 is a distributing-plate $4^a$ of annular form extending from the top of the casing 2 to the wall of the outer casing. In the same plane with the upper diaphragm 4 is an annular plate $3^a$, and a series of vertical pipes $8^a$ are arranged in the space between the filter-chamber and the outer wall of the casing 1, the upper ends of said pipes passing through the plate $3^a$ 4 and through a similar plate 9 below the lower end of the filter-chamber, whereby a closed steam-space 10 is formed, containing said vertical pipes, the latter opening into the filtered-fluid space $7^a$, which is provided with an outlet-pipe 12, having a valve 13. A relief-valve 14 is placed in a pipe 15, which communicates with the steam-space 10, surrounding the vertical pipes $8^a$, whereby any excess of pressure may be relieved. A steam-pipe 16 enters the outer casing 2 and supplies steam to the space 10, inclosing the pipes 8ª and the filter-chamber 2, and this pipe has a cock 17. The distributing-plate 4ª receives the filtered fluid overflowing from the water-space 5, and directs the same to the vertical pipes 8ª, in passing through which and through the filter said fluid is heated to or nearly to the boiling-point.

An inlet-pipe 19, provided with a valve 20, enters the outer casing and passes through the space 7ª and enters the sediment-chamber 6, its discharge end being preferably turned upward. A diffusing-plate 22 may be placed centrally on the lower diaphragm 4, in order to disperse the fluid over the surface of the latter.

The top of the casing or vessel 1 is preferably dome-shaped to form a steam-space or vacuum-chamber 23. Entering this chamber is a steam-pipe 24, which may communicate with the steam-pipe 16, and which is provided with a suitable cock 25. Penetrating this top, also, is a pipe 26, which is carried to a condenser 27 of any suitable form, its interior having connection by way of a pipe 28 with a pump 29, by which all vapors generated in the space 23 and not condensed in the condenser 27 are carried off, relieving the apparatus of any back-pressure. A vacuum-valve 30 and pressure-gage 31 may be mounted on the top of the casing 1.

The operation of the apparatus is as follows: The fluid flowing through the inlet-pipe 19 passes into the sediment-chamber 6 and is driven up through the filter, filling the receptacle 5, whence it overflows and runs over upon the distributing-plate 4ª, by which it is conducted to the series of vertical pipes 8ª. In flowing through these pipes the fluid which has already been heated by passing through the chamber 6 and the filter acquires a high temperature, and is discharged into the space 7ª below, whence it passes out by the way of the outlet-pipe 12 to any tank or other receptacle. During this operation the steam-pipe 16 is open to supply steam to the inclosed steam-space 10; but the pipe 24 is closed, and the pump 29 being in operation the steam or vapor is withdrawn from the vacuum-chamber 23 as fast as it is formed and condensed in the condenser 27. The fluid entering by way of the pipe 19 being heated more or less in the sediment-chamber 6, the heavier of its foreign matter or impurities are precipitated to the bottom of said chamber over the entrance to the blow-off pipe 7. To clean the filter, a cock 32 in the pipe 26 is closed, as well as the cock 20 in the inlet-pipe 19, and the cock 25 in the steam-pipe 24 and the valve 8 in the blow-off pipe 7 are opened, thereby creating a back-pressure in the vacuum-chamber 23, whereby the current is reversed, the fluid is driven down through the filter, thoroughly cleansing the latter, and the accumulated sediment in the chamber 6 is carried off through the blow-off. A cock 33 is placed at the bottom of the inclosed space 10 to carry off the water of condensation.

The modified construction shown in Fig. 2 is the same as that described, save that the pipe 26 and the condenser 27, with its adjuncts, are dispensed with and a common relief-valve 34 located on the top of the casing 1. With this exception the construction and operation in both forms of apparatus are substantially the same.

By the steam entering through the pipe 15 heat is communicated to the fluid in the sediment-chamber 6, whereby the impurities are, for the most part, precipitated to the bottom of said chamber, the remainder being separated by the passage of the fluid through the filter. After traversing the filter the fluid passes to the steam-space and thence to the pipes 8ª, which are heated by the steam supplied to the steam-space 10. From these pipes the fluid comes at a high temperature and enters the annular space between the outer casing and the sediment-chamber 6. From this annular space the clarified fluid passes at an appropriate temperature to the pipe 12. The cleansing of the filter and the removal of the impurities settling in the chamber 6 have been effected in the same manner in both.

The apparatus may be used for filtering and clarifying saccharine and other juices, or fluids and sirups, as well as glue and a variety of solutions containing foreign matter and impurities, or from which it is desired to remove coloring-matter. It may also be used to filter water in connection with feed-water heaters for steam-boilers and other purposes.

With the apparatus shown in Fig. 1 the pump may be worked at such speed, if desired, as to create a partial vacuum in the top of the casing 1, whereby the circulation and evaporation of the fluid will be considerably expedited.

What we claim is—

1. In a heating and filtering apparatus, the combination, with a closed casing, of an interior filter-chamber surrounded by a closed annular space, tubes arranged in said space and communicating with an upper space above the filter and a lower space between the outer casing and a sediment-chamber beneath the filter, a blow-off pipe and an inlet both inclosing the sediment-chamber, a steam-pipe communicating with the closed space surrounding the filter and with the space above the latter, a condenser communicating with the space above the filter, and an exhaust-pipe connected to the condenser and an outlet, substantially as described.

2. In a heating and filtering apparatus, the combination, with a closed casing, of an interior filter-chamber surrounded by a closed space, tubes arranged in said space and communicating with a chamber above the filter and inclosed space and with a lower chamber between the outer casing and a sediment-chamber beneath the filter, an inlet-pipe and a blow-off pipe both entering said sediment-chamber, entering the lower part of the outer casing, and a steam-pipe communicating with the steam-space surrounding the filter and with the chamber above the latter, substantially as described.

3. In a heating and filtering apparatus, the combination, with an outer casing, of an interior filter having a sediment-chamber below it and surrounded by an inclosed annular space, a series of pipes arranged in said space and communicating with a chamber above said space and above the filter and with a space or chamber between the sediment-chamber and the casing, an outlet-pipe entering said space or chamber, an inlet and a blow-off pipe both entering the sediment-chamber, and a steam-pipe communicating with the steam-space surrounding the filter and with the chamber above the latter, the wall of the filter-chamber being extended above its upper end and provided with a horizontal perforated plate overhanging the ends of the pipes in the steam-space, substantially as described.

4. In a heating and filtering apparatus, the combination of an outer casing having a pipe for connecting with a tank or other receptacle, an inner casing having a contracted lower end, a water-receptacle above, from which the filtered water overflows into the outer casing, a sediment-chamber below, and an intermediate filtering-chamber, a water-inlet pipe delivering the water into the inner casing below the filtering-chamber, and a blow-off pipe attached to the contracted lower end of the inner casing, substantially as described.

5. In a heating and filtering apparatus, the combination, with a casing, of an interior casing containing a filter and sediment-chamber, the latter connected with a blow-off pipe having a valve, an inlet entering the sediment-chamber, a pipe entering the outer casing and supplying steam to an inclosed space surrounding the filter, and a series of pipes arranged in said space and communicating with the space above and below, substantially as described.

6. In a heating and filtering apparatus, the combination, with a casing containing a filter-chamber, of an inlet-pipe entering a sediment-chamber below the filter-chamber, a series of pipes arranged in an inclosed annular space between the filter-chamber and the outer casing and communicating with the chamber above and below a steam-pipe supplying steam to the space in which said pipes are arranged, and a relief-valve placed in a pipe communicating with said space, substantially as described.

7. In a heating and filtering apparatus, the combination, with a casing, of a filter-chamber arranged therein and having a closed sediment-chamber below it separated from the filter-chamber by a perforated diaphragm, an inlet entering said sediment-chamber, a series of pipes arranged in the annular space between the filter-chamber and the outer casing, an annular distributing-plate distributing the filtered fluid to the open upper ends of said pipes, a steam-pipe supplying steam to the annular space in which said pipes are arranged, a relief-valve, an outlet-pipe for the filtered material, and a blow-off pipe communicating with the sediment-chamber and having a cock, substantially as described.

8. In a heating and filtering apparatus, the combination, with a filter-chamber or casing containing filtering material, of an outer casing inclosing said filter, one or more steam-pipes entering the space between the outer casing and filter, and pipes traversing said space and conveying the filtered liquid, substantially as described.

In testimony whereof we have affixed our signatures in presence of two witnesses.

WM. W. SUTCLIFFE.
JOHN D. SULLIVAN.

Witnesses:
JNO. S. MCDONALD,
J. E. VAQUIN.